United States Patent [19]
Hwa et al.

[11] Patent Number: 5,183,574
[45] Date of Patent: Feb. 2, 1993

[54] METHOD OF DISPERSING IRON

[75] Inventors: Chih Ming Hwa, Palatine; John A. Kelly, Crystal Lake; Wun Ten Tai, Palos Hills; Lai-Duien G. Fan, Lake Zurich, all of Ill.; Robert P. Kreh, Jessup, Md.; Brian Greaves, Runcorn, England

[73] Assignee: W. R. Grace & Co.-Conn., New York, N.Y.

[21] Appl. No.: 793,760

[22] Filed: Nov. 18, 1991

[51] Int. Cl.⁵ ............................................. C02F 5/10
[52] U.S. Cl. .................................... 210/701; 252/180
[58] Field of Search ............................. 210/698–701; 252/180, 181

[56] References Cited

U.S. PATENT DOCUMENTS

| | | | |
|---|---|---|---|
| 4,048,066 | 9/1977 | Cuisia et al. | 252/180 |
| 4,545,920 | 10/1985 | Lorenc et al. | 210/701 |
| 4,618,448 | 10/1986 | Cha et al. | 252/180 |
| 4,640,793 | 2/1987 | Persinski et al. | 210/701 |
| 4,680,135 | 7/1987 | Cha et al. | 252/180 |
| 4,885,097 | 12/1989 | Amjad et al. | 210/701 |
| 4,952,326 | 8/1990 | Amjad et al. | 210/701 |
| 4,952,327 | 8/1990 | Amjad et al. | 210/701 |
| 4,997,571 | 3/1991 | Roensch et al. | 210/698 |

FOREIGN PATENT DOCUMENTS 614685 2/1961 Canada ............................ 210/801

Primary Examiner—Peter Hruskoci
Attorney, Agent, or Firm—James P. Barr

[57] ABSTRACT

A method of comprising iron in an aqueous system comprising adding to the system a copolymer of styrene sulfonic acid and methacrylic acid or its water soluble salt in an amount effective to disperse the iron contained therein.

6 Claims, No Drawings

METHOD OF DISPERSING IRON

FIELD OF THE INVENTION

The invention relates to an improved method for dispersing iron in aqueous systems, and more specifically, it relates to the use of the copolymers of styrene sulfonic acid and methacrylic acid or their water soluble salts for dispersing iron in aqueous system.

BACKGROUND OF THE INVENTION

The control of iron precipitation in the presence of dissolve calcium is important in aqueous pigment dispersions, color strength improvement, ore flotation, manufacture of pulp and paper, slurry viscosity reduction, metal treating operations, textile processing, and water treatment.

While organophosphonates (e.g. amino tri(methylphosphonic acid) and hydroxyethylidene diphosphonic acid) and polyphosphates (e.g. sodium tripolyphosphate and sodium hexametaphosphate) have been used to inhibit the precipitation of iron, the organophosphonates are unfortunately sensitive to calcium hardness and prone to form calcium phosphonate precipitates. Polyphosphates are not thermally stable and will hydrolyze in an aqueous system to form orthophosphate which is extremely sensitive to calcium.

For these reasons, the use of the organophosphonates and polyphosphates heretofore in controlling iron precipitation have not been completely satisfactory. We have now discovered that copolymers of sodium styrene sulfonate and methacrylic acid are highly active iron dispersants. The copolymers of this invention are insensitive to calcium hardness and are thermally stable.

SUMMARY OF THE INVENTION

It is an object of this invention to provide a method for dispersing iron in aqueous systems.

It is another object of this invention to provide a novel iron dispersing agent which are insensitive to calcium hardness.

It is another object of this invention to provide a novel iron dispersing agent which are thermally stable.

In accordance with the present invention there has been provided a method for dispersing iron particles in aqueous systems which comprises adding to the system, in an amount effective to disperse the iron particles, a copolymer of sodium styrene sulfonate and methacrylic acid.

DETAILED DESCRIPTION

The present invention is directed to the use of certain copolymers of sodium styrene sulfonate and methacrylic acid as an iron dispersing agent for treating aqueous systems. More specifically, the method of this invention comprises adding a copolymer of sodium styrene sulfonate and methacrylic acid, or water soluble salts thereof, to an aqueous system in an amount effective to disperse iron particles contained therein.

The copolymers of the present invention, in general, have a mole ratio of sodium styrene sulfonate: methacrylic acid in the range of 5:95 to 95:5, respectively, preferably in the range of 10:90 to 90:10 respectively, and most preferably in the range of 20:80 to 80:20 respectively. Suitable copolymers for use in this invention have molecular weights of at least 600, preferably greater than 2,000 and are generally less than 1,000,000, preferably less than 100,000.

Calcium insensitivity is considered an important feature of this invention because it allows the copolymer of this invention to be used effectively in water of relatively high hardness. A calcium sensitivity test was devised to determine the tendency of a chemical to precipitate with calcium ions in solution. The test for calcium insensitivity of a compound, as used in this application, involves a cloud point test where the compound is added to a hard water containing 500 ppm calcium ion (as $CaCO_3$) which is buffered at pH 8.3 using 0.005 M borate buffer and has a temperature of 60° C. The amount of compound which can be added until the solution becomes turbid (the cloud point) is considered to be an indicator of calcium sensitivity. This cloud point test will be referred to herein as the "CA500 cloud point test". The calcium insensitive compounds of this invention have cloud points of at least about 25 ppm as determined by the CA500 cloud point test. Preferred compounds have a cloud point of a least 50 ppm; and the most preferred compounds have a cloud point of at least about 75 ppm as determined by the CA500 cloud point test because they are considered particularly versatile with regard to the water systems in which they can be effectively used.

As is apparent from the results illustrated in Table 1, not all phosphonates or polyphosphates have suitable CA500 cloud points. For example, calcium phosphonate precipitates formed with amino tri(methylphosphonic acid) and hydroxyethylidene diphosphonic acid with cloud points of 10 ppm and 7 ppm, respectively. These results indicate that amino tri(methylphosphonic acid) and hydroxyethylidene diphosphonic acid are very sensitive to calcium hardness and prone to form calcium phosphonate precipitates at low treatment concentrations. Calcium phosphate precipitates form with orthophosphate (e.g. monosodium phosphate) with a cloud point <3 ppm indicating that the orthophosphate is extremely sensitive to calcium. On the contrary, the copolymers of the instant invention, as illustrated in Table 1, were relatively insensitive to calcium.

TABLE 1

| Additive | Comonomer Ratio by Mole | Cloud Point ppm |
|---|---|---|
| Amino tri(methylphosphonic acid) | — | 10 |
| Hydroxyethylidene diphosphonic acid | — | 7 |
| Sodium tripolyphosphate | — | 20 |
| Monosodium phosphate | — | <3 |
| Sodium styrene sulfonate - methacrylic acid copolymer (Sample No. 1052-95A) | 25:75 | >100 |
| Sodium styrene sulfonate - methacrylic acid copolymer (Sample No. 1077-67C) | 20:80 | >100 |
| Sodium styrene sulfonate - methacrylic acid copolymer (Sample No. 1052-95B) | 16.2:83.8 | >100 |
| Sodium styrene sulfonate - methacrylic acid copolymer (Sample No. 1077-71D) | 15:85 | >100 |
| Sodium styrene sulfonate - methacrylic acid copolymer (Sample No. 1077-65C) | 10:90 | 57 |

Another important feature of this invention is the thermal stability of the copolymers of the invention. A thermal stability test was devised to measure the stability of a chemical at elevated temperatures and pressures.

The thermal stability of several water treatment compounds including the copolymers of this invention were tested at 279° C. and 900 psig in water. The results after heating for 4 hours and 21 hours are illustrated in Table 2.

TABLE 2

| Additive | % Recovery | |
|---|---|---|
| | 4 Hours | 21 Hours |
| Amino tri(methylphosphonic acid) | 59.6 | 33.5 |
| Hydroxyethylidene diphosphonic acid | 53.9 | 2.7 |
| Sodium tripolyphosphate | 0 | — |
| Sodium hexametaphosphate | 0 | — |
| Sodium styrene sulfonate - methacrylic acid copolymer 25:75 (Sample No. 1052-95A) | 86.7 | 77.5 |
| Sodium styrene sulfonate - methacrylic acid copolymer 20:80 (Sample No. 1077-67A) | 83.2 | 79.0 |
| Sodium styrene sulfonate - methacrylic acid copolymer 15:85 (Sample No 1077-66C) | 97.7 | 77.8 |
| Sodium styrene sulfonate - methacrylic acid copolymer 5:95 (Sample No. 1052-85C) | 85.3 | 71.8 |
| Sodium polymethacrylate | 74.6 | 50.4 |

The iron dispersing agents of the present invention may be used in various aqueous systems including, but not limited to, cooling water systems, desalinization units, gas scrubbers, boiler systems, recirculating water systems and the like. Due to the thermal stability and calcium insensitivities of the copolymers of this invention, the claimed iron dispersing agents are most advantageously used in systems having high hardness and/or high temperature and pressure conditions such as, e.g., steam generating boilers.

In accordance with this invention, iron particles may be effectively dispersed in aqueous systems by adding to the system an effective amount of a copolymer of sodium styrene sulfonate and methacrylic acid. The precise dosage amount of the iron dispersing agents of this invention depends, to some extent, on the nature of the aqueous system in which it is to be incorporated and the degree of protection desired, as well as the amount of iron particles which may be present in the system. In general, however, the concentration of copolymer maintained in the system water can be from about 0.1 ppm to about 10,000 ppm. Within this range, generally low dosages of about 1 ppm to 500 ppm are preferred. Thus, the exact dosage amount is not per se critical to the invention, and those skilled in the art can readily determine the appropriate dosage by conventional means.

The iron dispersing agents of this invention may be added to the aqueous system by any convenient mode, such as by first forming a concentrated solution, preferably with water and containing between 1 and 50 total weight percent of the copolymer, and then feeding the concentrated solution into the aqueous system at some convenient point. In many instances the iron dispersants may be added to the make-up or feed water lines through which water enters the system.

The iron dispersants of the instant invention may also be used advantageously with other known water treatment agents including, but not limited to scale inhibitors, corrosion inhibitors, phosphates, phosphonates, yellow metal corrosion inhibitors, pH regulators, other dispersants, oxygen scavengers, and the like as mixtures thereof.

The following examples are provided to illustrate the present invention in accordance with the principles of this invention, but are not to be construed as limiting the invention in any way except as indicated in the appended claims. All parts and percentages are by weight unless otherwise indicated.

EXAMPLE 1

The effectiveness of sodium styrene sulfonate-methacrylic acid copolymer (Sample No. 1052-95A) was tested for dispersing iron oxide powder. The iron oxide is a reagent grade ferric oxide powder supplied by J. T. Baker, Inc. It contains ferric oxide ($Fe_2O_3$) 99.7%, phosphate ($PO_4$) 0.01%, sulfate ($SO_4$) 0.05%, copper (Cu) 0.001%, manganese (Mn) 0.02%, and zinc (Zn) 0.001%.

To a 25 mm diameter round cell containing a small 13 mm long magnetic stirring bar is added 30 ml of ferric oxide suspension (0.1% in Chicago tap water). Treatment is added to this suspension and the contents are mixed for one minute. Now the cell is removed from the magnetic stirrer and the light transmittance vs. time is measured after standing for 0.5 hour, 1 hour and 2 hours, using a Coleman spectrophotometer at the wavelength of 450 nanometers.

| Concentration of Sodium Styrene Sulfonate-Methacrylic Acid Copolymer | % Light Transmittance after Standing for: | | |
|---|---|---|---|
| | 0.5 Hour | 1 Hour | 2 Hours |
| 0 ppm | 17.4 | 53.0 | 62.4 |
| 2 ppm | 1.4 | 10.6 | 31.3 |
| 6 ppm | 0.7 | 5.5 | 22.8 |
| 8 ppm | 0.9 | 7.3 | 17.5 |
| 10 ppm | 0.7 | 4.3 | 18.4 |

As shown in the above table, the sodium styrene sulfonate-methacrylic acid copolymer is very effective in dispersing ferric oxide powder.

EXAMPLE 2

Sodium styrene sulfonate-methacrylic acid copolymer was further tested for it stability to disperse hematite. The copolymers were dissolved at 2.5 ppm in Chicago tap water, and the pH was adjusted to 8.0±0.2. Anhydrous hematite ($Fe_2O_3$, 1-5 micron particles size, 0.1%) was added, and the mixtures were shaken at 300 rpm for 17 hours at 54° C. The mixtures were than allowed to settle for 30 minutes, and samples were withdrawn at 50% depth and analyzed for total iron by atomic absorption spectrometry.

| Additive | % Hematite Dispersed |
|---|---|
| Blank | 3.5 |
| Sodium styrene sulfonate - methacrylic acid copolymer 25:75 (Sample No. 1052-95A) | 87.0 |
| Sodium styrene sulfonate - methacrylic acid copolymer 15:85 (Sample No. 1052-95B) | 63.0 |
| Sodium styrene sulfonate - methacrylic acid copolymer 5:95 (Sample No. 1052-95C) | 40.0 |

It can be seen that the sodium styrene sulfonate-methacrylic acid copolymer is very effective in inhibiting the precipitation of hematite particles in aqueous system.

EXAMPLE 3

The effectiveness of sodium styrene sulfonate-methacrylic acid copolymer (Sample No. 1052-95A) was tested for dispersing rust formed from coupon corrosion. The rust formed from coupon corrosion is collected from the bottom of the beaker, where suspended mild steel coupons had been exposed to a salty atmosphere by bubbling a brine solution. The rust was filtered, washed with water and air-dried before use.

To a 25 mm diameter round cell containing a small 13 mm long magnetic stirring bar is added 30 ml of rust suspension (0.1% rust in Chicago tap water). Treatment is added to this suspension and the contents are mixed for one minute. After mixing, the cell is removed from the magnetic stirrer and the light transmittance vs. time is measured after standing for 0.5 hour, 1 hour, 2 hours and 3.5 hours, using a Coleman spectrophotometer at the wavelength of 450 nanometers.

| Concentration of Sodium Styrene Sulfonate-Methacrylic Acid Copolymer | % Light Transmittance after Standing for: | | | |
|---|---|---|---|---|
| | 0.5 Hour | 1 Hour | 2 Hours | 3.5 Hours |
| 0 ppm | 11.2 | 27.8 | 48.8 | 58.3 |
| 2 ppm | 1.0 | 1.3 | 2.9 | 20.0 |
| 4 ppm | 1.0 | 1.2 | 2.4 | 17.7 |
| 6 ppm | 1.2 | 1.4 | 2.8 | 20.8 |
| 8 ppm | 1.0 | 1.3 | 2.4 | 18.4 |
| 10 ppm | 1.0 | 1.4 | 2.2 | 13.0 |

It is evident from the above table that the sodium styrene sulfonate-methacrylic acid copolymer is highly effective in dispersing iron oxide from rusted coupons.

EXAMPLE 4

A test water containing 5 ppm ferric chloride (as Fe), 5 ppm polymer, 30 ppm calcium (as $CaCO_3$), 10 ppm magnesium (as $CaCO_3$), 4 ppm silica and 45 ppm bicarbonate (as $HCO_3$) was prepared. The polymer under test was added to water after the addition of the ferric chloride but prior to the addition of calcium, magnesium, silica or bicarbonate. The pH of the solution was raised to pH 11.0, which precipitated the soluble ferric chloride in situ as ferric hydroxide. The resultant mixture was refluxed for 3 hours. The hot solution (250 ml) was decanted into a 250 ml graduated measuring cylinder and allowed to settle for 23 hours. At the end of the test a small sample of test water was removed from the top of the liquid and the concentration of iron determined.

A good iron dispersant will maintain most of the iron suspended in solution at the end of the test, hence giving an iron concentration close to the initial value of 5 ppm.

Experimental results of the settlement test are shown below.

| Additive | Concentration of Iron in Test Water after 23-Hour Settling, ppm |
|---|---|
| Blank | 0.63 |
| Sodium styrene sulfonate - Methacrylic Acid Copolymer 25:75 (Sample No. 1052-95A) | 4.88 |
| Sodium styrene sulfonate - Methacrylic Acid Copolymer 20:80 (Sample No. 1077-67C) | 4.76 |
| Sodium styrene sulfonate - Methacrylic Acid Copolymer 17.4:82.6 (Sample No. 1052-91B) | 4.64 |
| Sodium styrene sulfonate - Methacrylic Acid Copolymer 16.2:83.8 (Sample No. 1052-95B) | 4.76 |
| Sodium styrene sulfonate - Methacrylic Acid Copolymer 15:85 (Sample No. 1077-66C) | 4.69 |
| Sodium styrene sulfonate - Methacrylic Acid Copolymer 10:90 (Sample No. 1007-65A) | 4.71 |
| Sodium styrene sulfonate - Methacrylic Acid Copolymer 5:95 (Sample No. 1052-85C) | 4.64 |

As shown in the above table, the sodium styrene sulfonate-methacrylic acid copolymer is highly effective in preventing the settling of ferric hydroxide.

We claim:

1. A method of dispersing iron in an aqueous system comprising adding to the system a copolymer of styrene sulfonic acid and methacrylic acid or its water soluble salt in an amount effective to disperse the iron contained therein wherein said copolymer has a molar ratio of styrene sulfonic acid: methacrylic acid from 5:95 to 95:5.

2. The method of claim 1 wherein the molar ratio of styrene sulfonic acid:methacrylic acid is from 10:90 to 90:10.

3. The method of claim 1 wherein the molar ratio of styrene sulfonic acid:methacrylic acid is from 20:80 to 80:20.

4. The method of claim 1 wherein the molecular weight of the copolymer ranges from 600 to 1,000,000.

5. The method of claim 1 wherein the molecular weight of the copolymer ranges from 2,000 to 100,000.

6. The method of claim 1 wherein the water soluble salt is a sodium salt.

* * * * *